No. 850,949. PATENTED APR. 23, 1907.
F. MUHL.
PLANTER.
APPLICATION FILED OCT. 10, 1906.

Inventor
F. Muhl

Witnesses
By W. J. FitzGerald & Co.
Attorneys

UNITED STATES PATENT OFFICE.

FRITZ MUHL, OF DENISON, IOWA.

PLANTER.

No. 850,949.        Specification of Letters Patent.        Patented April 23, 1907.

Application filed October 10, 1906. Serial No. 338,295.

*To all whom it may concern:*

Be it known that I, FRITZ MUHL, a citizen of the United States, residing at Denison, in the county of Crawford and State of Iowa, have invented certain new and useful Improvements in Planters; and I do hereby declare the following to be a full, clear, and exact description of the invention, such as will enable others skilled in the art to which it appertains to make and use the same.

My invention relates to new and useful improvements in planters, and more particularly to that class known as "corn-planters;" and my object is to provide means for automatically operating parts of the machine whereby the grain will be dropped at specified intervals.

A further object is to provide means for engaging the soil at each side of the planter and making a mark therein, the action of the marking mechanism being so regulated that the mark will be coincident with the discharge of the grain from the planter, thereby enabling the operator to readily ascertain the starting-point at the end of the row.

Other objects and advantages will be hereinafter referred to and more particularly pointed out in the claims.

Figure 1:
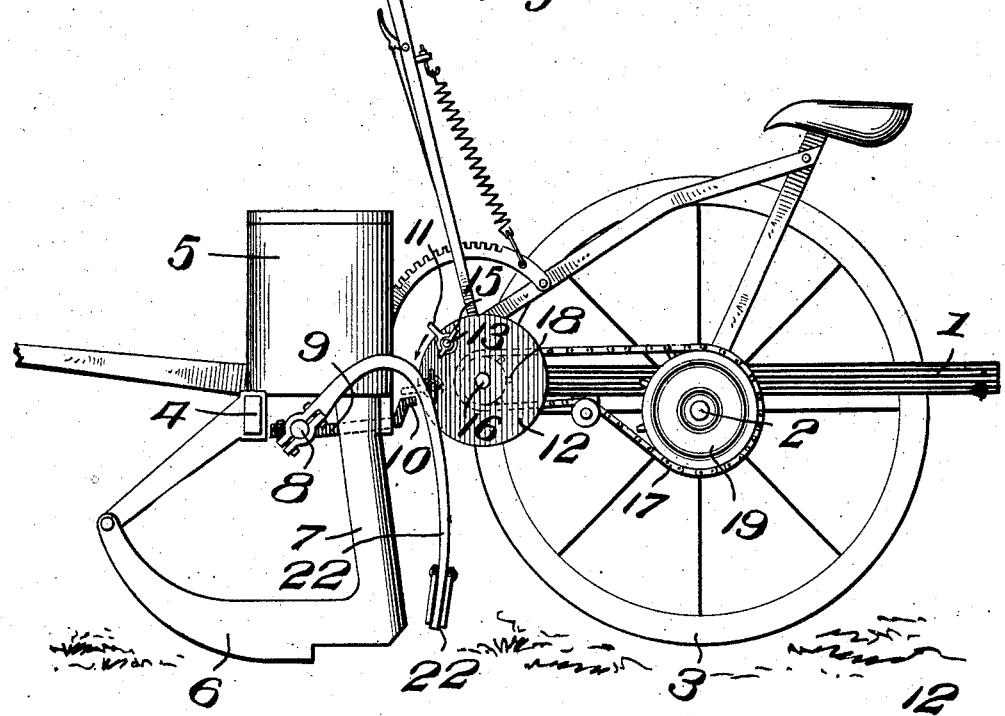
Figure 3:
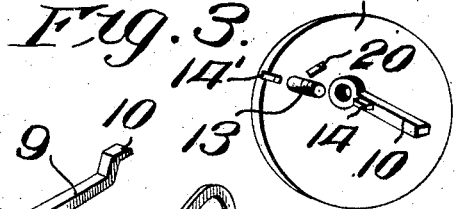
Figure 2:
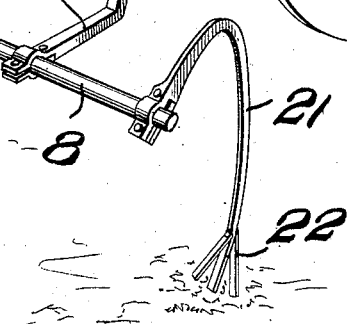

In the accompanying drawings, which are made a part of this application, Figure 1 is a side elevation of a planter-frame with one of the wheels thereof removed and showing my improved attachment secured thereto. Fig. 2 is a perspective view of the marker-arms and parts of the planter to which the same are attached, and Fig. 3 is a perspective view of a portion of the operating mechanism removed from the planter and parts thereof separated from each other.

Referring to the drawings, in which similar reference-numerals designate corresponding parts throughout the several views, 1 indicates the main frame of a planter, which is preferably mounted upon an axle 2, said axle being in turn supported and driven by wheels 3.

Secured in any preferred manner to the front end of the wheel-frame 1 is a front or auxiliary frame 4, upon which is mounted the usual form of grain-hopper 5, and depending from the auxiliary frame 4 is the usual form of runner-shoe or furrow-opener 6, the rear end of which is connected with the grain-hopper 5 by means of chutes 7, said chutes conveying the grain from the hoppers to the furrow formed by the shoe 6.

The grain-hoppers 5 are provided with the usual form of dropping-plates, (not shown,) which are operated in the usual manner from an operating-bar 8, the connections between the operating-bar and the plate not being shown, as they form no part of my invention. In order to successively operate the operating-bar 8, I have adjustably secured thereon a lever 9, said lever being provided with a lip 10 at its free end, with which is adapted to engage a trip-arm 11, carried by a drum 12. The trip-arm 11 is adapted to normally extend beyond the edge of the drum 12 to engage the lip 10, and is held in its adjusted position by means of a bolt 13 being directed through the drum 12 and the head of the trip-arm 11, and is prevented from turning upon the bolt 13 by means of a tongue 14, which is adapted to be seated in a notch 14' in the face of the drum 12, the tongue being disposed into the notch in the drum by means of a wing-nut 15, which is disposed on the threaded end of the bolt 13.

The drum 12 is mounted upon a shaft 16, which is in turn mounted in any preferred manner upon the frame 1, and said drum is rotated through the medium of a sprocket-chain 17, which is disposed, respectively, around a sprocket-wheel 18, secured to the drum 12, and a sprocket-wheel 19, secured to the axle 2, so that when the planter is driven forward the drum 12 will be rotated.

When the planter is being moved from place to place and it is not desired to have the trip-arm 11 engage the lever 9, the wing-nut 15 is loosened sufficiently to allow the tongue 14 to swing free of the notch 14', after which the trip-arm 11 is disposed over the face of the drum 12 and the tongue 14 directed into engagement with a notch 20, after which the nut 15 is again directed onto the bolt and the trip-arm held out of the path of the lever 9, so that the drum can freely rotate without operating the operating mechanism.

In order to enable the operator to regulate the operation of the machine, so that the grain in the new rows will be dropped in line with the grain previously dropped, I have provided suitable markers comprising curved shanks 21, the upper ends of which are secured to the operating-bar 8, while the lower ends thereof are provided with fingers 22, said fingers being spaced apart, so that when directed into engagement with the earth a considerable amount of soil will be displaced, thereby leaving a perfectly plain impression in the soil.

By this construction it will be seen that when the operating-bar 8 is operated to drop the corn from the hoppers that the fingers 22 will be lowered into engagement with the soil, and the shanks 21 are so disposed upon the operating-bar 8 that the fingers will be in engagement with the soil simultaneously with the dropping of the corn from the grain-hoppers, the mark in the soil caused by the fingers clearly indicating the point in the row at which the grain is deposited, so that when the operator reaches the end of the rows he can readily ascertain at what point to set the machine in order to drop the grain so as to coincide with the grain dropped in the preceding rows.

It will now be seen that I have provided a very cheap, durable, and economical device for dropping grain and indicating the point at which it is dropped, and it will also be seen that I have provided a construction which can be readily attached to any form or make of planter.

What I claim is—

1. The combination with a planter-frame having an operating-bar; of a lever adjustably secured to said operating-bar, a lip at the free end of said lever, a drum rotatably mounted on said frame, a trip-arm adjustably secured to said drum and extended beyond the edge thereof, means to rotate said drum whereby said trip-arm will engage said lip and operate the operating-bar, shanks mounted upon said operating-bar and fingers at the lower end of said shanks adapted to be disposed into engagement with the soil simultaneously with the operation of said operating-bar.

2. The combination with a planter-frame having an operating-bar; of a lever adjustably secured to said operating-bar, a lip at the free end of said lever, a drum rotatably mounted on said frame, a trip-arm adjustably secured to said arm and extending beyond the edge thereof, a tongue upon said trip-arm adapted to be seated in a notch in the edge of said drum when the arm is in the path of said lever, and a similar notch in the body of the drum when the arm is removed from the path of said lever, means to hold said arm in position upon the drum and means to rotate said drum, whereby said trip-arm will engage said lip and operate the operating-bar.

In testimony whereof I have signed my name to this specification in the presence of two subscribing witnesses.

FRITZ MUHL.

Witnesses:
JOHANN MUHL,
C. J. KEMMING.